United States Patent
Kota et al.

(10) Patent No.: US 11,751,091 B2
(45) Date of Patent: Sep. 5, 2023

(54) ULTRA-LOW LATENCY OPERATING MODE EFFECTUATION IN WIRELESS NETWORK CONTROLLERS

(71) Applicant: Cypress Semiconductor Corporation, San Jose, CA (US)

(72) Inventors: Prashant Kota, Karnataka (IN); Sri Ramya Thota, Bangalore (IN); Vinayak Kamath, Mangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 188 days.

(21) Appl. No.: 17/022,940

(22) Filed: Sep. 16, 2020

(65) Prior Publication Data

US 2022/0060927 A1   Feb. 24, 2022

Related U.S. Application Data

(60) Provisional application No. 63/069,639, filed on Aug. 24, 2020.

(51) Int. Cl.
*H04W 28/02*   (2009.01)
*H04W 72/04*   (2023.01)
*H04W 84/12*   (2009.01)

(52) U.S. Cl.
CPC ....... *H04W 28/0268* (2013.01); *H04W 72/04* (2013.01); *H04W 84/12* (2013.01)

(58) Field of Classification Search
CPC . H04W 28/0268; H04W 72/04; H04W 84/12; H04W 72/044; H04W 72/042; H04L 5/0053; H04L 5/0078
See application file for complete search history.

(56) References Cited

U.S. PATENT DOCUMENTS

| | | | |
|---|---|---|---|
| 2018/0270861 A1* | 9/2018 | Baron | H04W 74/0816 |
| 2020/0205140 A1* | 6/2020 | Du | H04W 72/04 |
| 2020/0287838 A1* | 9/2020 | Baron | H04L 47/6215 |

* cited by examiner

*Primary Examiner* — Rushil P. Sampat

(57) ABSTRACT

Implementations disclosed describe techniques to effectuate operating mode changes of a wireless connection between a first communication device (CD) and a second CD. In an example embodiment, the disclosed techniques may include detecting, by a wireless network controller of the second CD, an indication that the first CD has requested the operating mode change from a first operating mode to a second operating mode. The disclosed techniques may further include modifying a transmission information (TI) associated with one or more frames in a transmission queue of the second CD, the TI including a representation used by a physical layer of the second CD to configure transmission of a respective frame to the first CD, wherein the one or more frames in the transmission queue have been previously programmed with a first-mode TI, and wherein modification of the TI is to a second-mode TI.

20 Claims, 7 Drawing Sheets

ULTRA-LOW LATENCY OPERATING MODE EFFECTUATION IN WIRELESS NETWORK CONTROLLERS

RELATED APPLICATIONS

This application claims the benefit of U.S. Provisional Application No. 63/069,639, filed Aug. 24, 2020, the entire contents of which are incorporated herein by reference.

TECHNICAL FIELD

The disclosure pertains to wireless networks; more specifically, to effectuating fast operating mode changes to improve performance of wireless networks.

BACKGROUND

Wireless networks often have connectivity whose throughput varies depending on intrinsic conditions, such as the capabilities and configuration of devices connected to the network, as well as extrinsic conditions, such as the conditions of electromagnetic wave propagation in the environment. An access point may support a certain bandwidth while some of the stations connected to the access point are capable of utilizing the full bandwidth or only a portion of it. A station and the access point may establish a wireless connection with an operating mode that is based on an intersection of the capabilities of the two devices. For example, the operating mode established by the two devices may have the bandwidth that is the smaller of the bandwidths of the access point and the station. Sometimes, intrinsic or extrinsic conditions change with time and the devices connected to the wireless network are forced to modify their operating modes. Changes to the operating modes take some time to be performed and thus may result in an increased latency of data transfer, affecting negatively the overall performance of the network.

DETAILED DESCRIPTION

Figure 1:
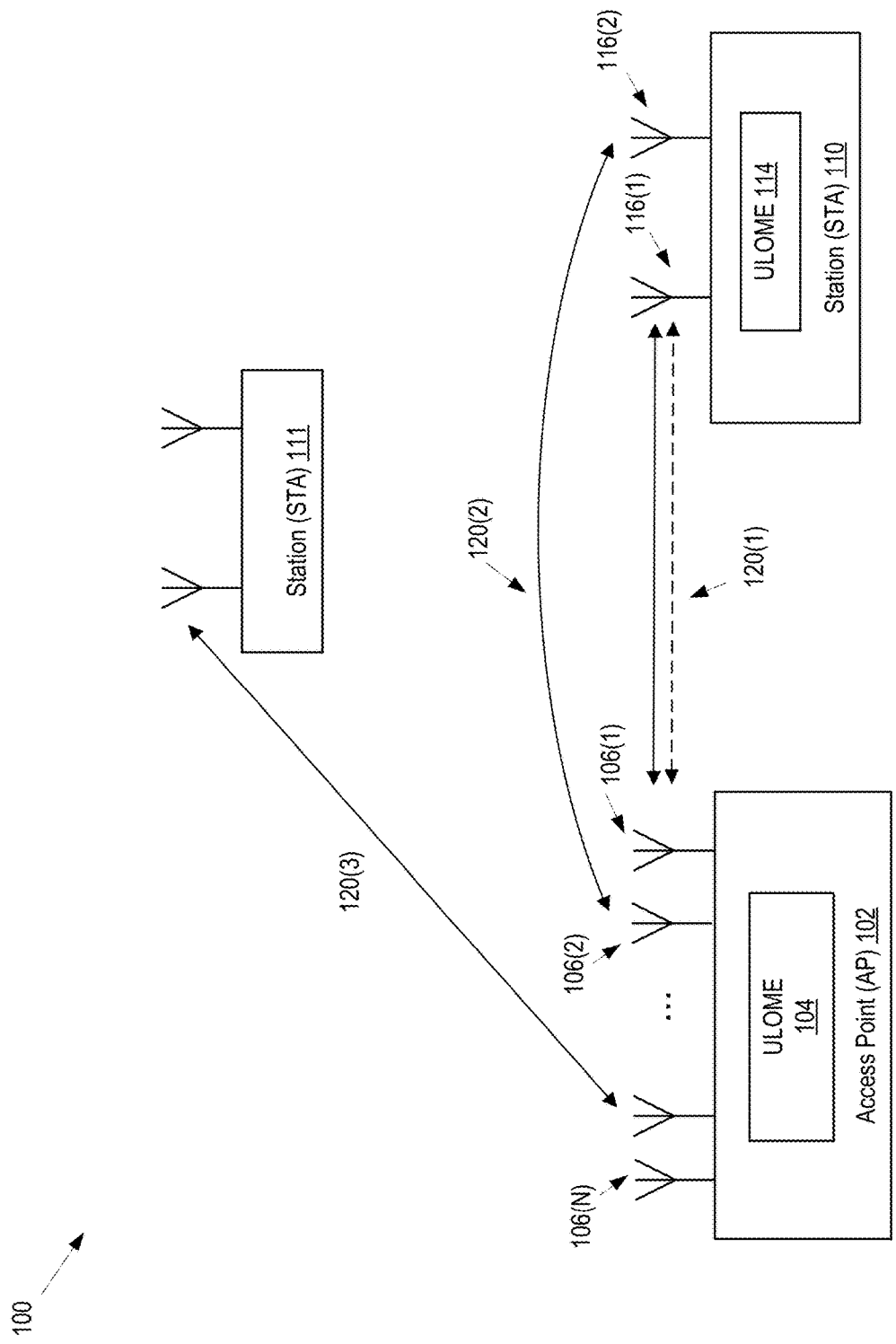
FIG. 1 illustrates one exemplary implementation of a wireless network that has one or more access points and one or more station devices, whose performance may be optimized by a network controller enabling fast operating mode changes.

Aspects of the present disclosure are directed to a fast implementation of the operating mode (OM) changes of the connection of various devices supported in a wireless network. An access point (AP) may provide wireless network services to multiple stations (ST), e.g., client devices. An OM established when AP and STA negotiate an initial connection may be changed (multiple times) later. For example, an AP that has 4 antennas supporting 4 spatial streams (SS) with the 160 MHz maximum bandwidth and a STA that has 2 antennas (supporting 2 SS) with the 80 MHz maximum bandwidth, may initially establish a first OM that is characterized by 1 SS and 80 MHz bandwidth, if the STA's second antenna is currently experiencing interference that prevents it from efficiently receiving and transmitting data. With time, a wireless chip of STA may become overheated and STA may initiate an OM change into a second OM that has 1 SS and 40 MHz bandwidth, to reduce the STA chip temperature. At some later time, the second STA antenna may become available as the amount of interference in the network is diminished. Accordingly, STA may initiate another OM change into a third OM with 2 SS and 40 Hz bandwidth, and so on.

Changing OM may take some significant time. For example, to implement a change, under Very High Throughput (VHT) IEEE 802.11ac standard, a first device (a STA or AP, if the change is AP-initiated) may need to place an action frame at the end of the queue of other data frames scheduled for transmission to the second device. The action frame includes an OM notification element that signals to the other device that the first device requests a change of the OM. The second device eventually receives the action frame. The media access control address (MAC) layer of the second device processes the action frame, acknowledges the OM change and begins using the new OM. Such process is slow and may take several milliseconds or more to compete the OM change. Moreover, frames that were previously queued but not transmitted yet, are still going to be transmitted using the old OM settings.

The newer standards, such as the High-Efficiency Wireless (HEW) IEEE 802.11ax, may allow for a more efficient OM change mechanism. An OM change indicator may be inserted into a High Throughput Control field (HTC field) of the MAC header of a frame transmitted over the wireless connection. Aspects and implementation disclosed herein overcome the above-described challenges and reduce significantly the latency involved in OM change processes. Disclosed is a network controller that makes efficient use of OM change indications that may be communicated using Quality of Service (QoS) data frames.

The network controller may have an upper MAC function and a lower MAC function, which may be implemented on separate chips or on a single chip. The upper MAC may receive data packets (e.g., from a host device), produce data frames and place the data frames in a transmission queue. The upper MAC may also provide transmission descriptors to the data frames that are based on the current OM. The upper MAC may also perform monitoring of the extrinsic and intrinsic conditions that may trigger an OM change. The transmission descriptors may be used to provide instructions to a physical layer (PHY) how to transmit the data frames over the wireless network. A mode change operation may be a collaborative process that involves an OM change-initiating device ("initiating device") and an OM change-responding device ("responding device"). The upper MAC of the initiating device may determine that an OM change is to be performed. The lower MAC of the initiating device may introduce an OM change indicator in an appropriate field of a frame (e.g., the first frame in the transmission queue and/or subsequent packets in the queue) without changing the transmission descriptors. The lower MAC of the responding device, having received the data packet with the OM change indicator, may start modifying the transmission descriptors in the transmission queue of the responding device, the modified transmission descriptors instructing the PHY layer of the responding device to transmit the frames in the transmission queue using the new OM mode, as prescribed in the OM change indicator received from the initiating device. The modifications of the transmission descriptors may include overwriting values corresponding to the old OM in the transmission descriptors with values corresponding to the new OM. Additionally, the upper MAC of the responding device may start providing, to the new frames (added at the back of the queue of the responding device), transmission descriptors that are to instruct the PHY layer to transmit the new frames based on the new OM. The upper MAC may communicate to the lower MAC the identifier of the oldest frame having the new descriptor (or the youngest frame having the old descriptor) to advise the lower MAC when to stop reprogramming the descriptors from the old OM to the new OM. The lower MAC of the responding device may also generate an acknowledgement frame to acknowledge, to the initiating device, that the transition to the new OM has been performed.

In its turn, the lower MAC of the initiating device, having detected receiving an acknowledgement (e.g., an ACK frame) from the responding device (and hence detecting that the requested change of the OM has been accepted), begins modifying the transmission descriptors in the transmission queue of the initiating device to instruct its PHY layer to transmit the frames in the transmission queue (of the initiating device) using the new OM mode. Additionally, the upper MAC of the initiating device may start providing, to the new frames (added at the back of the queue of the initiating device), transmission descriptors in the new OM. The upper MAC may also advise the lower MAC when to stop reprogramming the descriptors from the old OM to the new OM.

As a result, both devices transition to the new OM extremely quickly, without having to wait until the entire queue of the data packets already programmed in the old OM (by either device) are transmitted. The reduction of latency may be quite significant. For example, using the existing technology, it may take tens of milliseconds (or more) to cycle through the queue of the data frames already programmed by the initiating device, transmit an OM change action frame, have the action frame detected and processed by the responding device, transmit an acknowledgement frame, have the responding device to transmit the queue of the data frames already programmed before the new OM is effectuated, and so on. On the other hand, the fast OM change process implemented by the network controller disclosed herein may only take tens of microseconds (or less).

In some implementations, as disclosed in more detail below, improvement in OM change process may also be achieved when only one of the devices (e.g., the responding device) has the fast network controller whereas the other device (e.g., the initiating device) is a legacy device. In such implementations, the lower MAC of the responding device may begin modification of transmission descriptors as soon as a request to change the OM is received from the legacy initiating device, while the upper MAC of the responding device begins to program new data packets with the new transmission descriptors.

FIG. 1 illustrates one exemplary implementation of a wireless network 100 that has one or more access points and one or more station devices, whose performance may be optimized by a network controller enabling fast operating mode changes. The wireless network 100 may be a wireless local area network (WLAN), wireless wide area network (WWAN), wireless metropolitan area network (WMAN), wireless personal area network (PAN), and so on. In one implementation, wireless network 100 may have one or more access points (base stations), such as AP 102 equipped with one or more antennas 106(1) . . . (N) capable of supporting various spatial streams (SS) of wireless signals. The wireless connection may use any bands, such as the 2.4 GHz regulatory domain, the 5 GHz domain, the 60 GHz domain, the 6 GHz domain, or any other frequency band.

AP 102 may, in some implementations, include multiple access points, e.g., a first AP operating in a first band (e.g., 2.4 GHz) and a second AP operating in a second band (e.g., 5 GHz), which may use the same or separate antennas 106, some of which may be multiple-input and multiple-output (MIMO) antenna. AP 102 may include an Ultralow Latency OM effectuation controller (ULOME) 104 to enable fast OM changes as described above and disclosed in more detail with respect to FIGS. 2-4. ULOME 104 may be integrated into AP 102 or may be communicating with AP 102 electronically or wirelessly.

The wireless network 100 may support multiple stations (STA), such as client devices, e.g., STA 110 and 111. Some of the stations may include similar ULOME controllers. For example, STA 110 may include ULOME 114. Some of the stations, e.g., STA 111, may be legacy stations with no ULOME functionality. Wireless connections between access points and stations (or, peer-to-peer connections between different stations and/or between different access points) may have different maximum numbers of supported SS and different maximum bandwidths, herein referred to as OM of the connection. For example, the wireless connection between AP 102 and STA 110 may have two spatial streams 120(1) and 120(2) enabled by AP antennas 106(1) and 106(2) and STA antennas 116(1) and 116(2), as depicted schematically in FIG. 1. Over the duration of the wireless connection, some of SS may become unavailable, e.g., may experience an excessive amount of interference rendering one or more SS ineffective for wireless connection. For example, SS 120(2) may become ineffective at some point. Furthermore, a bandwidth of the connection may change (up or down) with time. For example, as indicated by the dashed line, a bandwidth may change from, e.g., 40 MHz (solid and dashed lines 120(1)) to 20 MHz (solid line 120(1) alone). To respond to the changing conditions, various access points and stations may change, from time to time (e.g., for maximum efficiency), the OM modes of the connections.

Aspects and implementations of the present disclosure address efficient and fast OM change using ULOME controllers, as disclosed below. In some implementations, only one device, such as AP 102, of a wireless connection, e.g., connection 120(3), may have the ULOME functionality. In such implementations, ULOME-enabled efficient OM change may still be implemented, e.g., when the initiating device is a legacy device (e.g., STA 111) and the responding device is a ULOME-equipped device (e.g., AP 102).

The wireless network 100 may be implemented in a metropolitan environment, commercial environment, office environment, home environment, automotive environment (or any other transportation environment), and so on.

Figure 2:
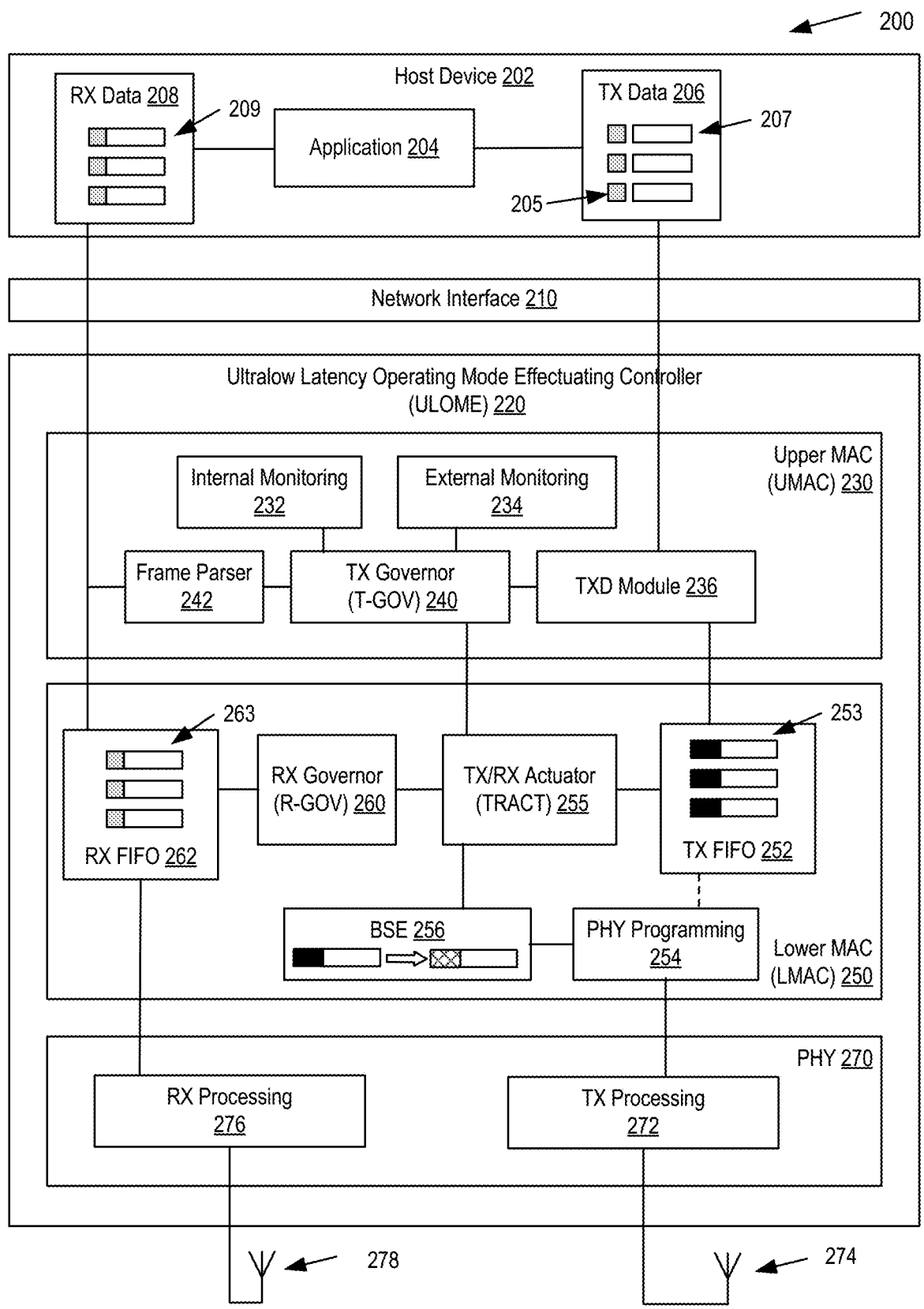
FIG. 2 is a block diagram of one exemplary architecture of a device that includes a network controller capable of fast and efficient operating mode changes in wireless networks, in accordance with some implementations of the present disclosure.

FIG. 2 is a block diagram of one exemplary architecture of a device 200 that includes a network controller capable of fast and efficient operating mode changes in wireless networks, in accordance with some implementations of the present disclosure. Some components shown in FIG. 2 may be optional. The architecture shown may include a host device 202 having an application 204 instantiated thereon that exchanges data with other devices of the network. The host device 202 may be any computing device, such as a desktop computer, a server, a laptop computer, a tablet, a smartphone, an Internet-of-Things device, a smart controller, a video device, an audio device, or any other device that may be a part of a wireless network (e.g., network 100). The application 204 may be any application (e.g., a browser, a graphics application, a word-processing application, an operating system, a virtual machine, and so on) that may operate on the host device 202. The application 204 instantiated on the host device 202 may prepare outgoing transmission data, e.g., TX data 206, which may include multiple TX data packets 207. The term "data packet" should be understood to include any part of a data packet, e.g., a data segment, a data string, and the like. The data load of each data packet is depicted with a white rectangle. Depicted with grey squares are various metadata that may be used by the host device 202 or by a network layer of the Open System Interconnect (OSI). The metadata may describe the nature of the data packets (e.g., video, audio, web content, etc.), the priority of the data (e.g., high, normal, low), or any other type of information describing the data packets. Additionally, the application 204 may receive incoming transmission data, e.g., RX data 208, which may include multiple RX data packets 209. The TX data packets 207 and RX data packets 209 may be communicated to a network controller. The network controller may be a ULOME controller, such as ULOME 220.

The TX data packets 207 may be communicated across a network interface 210. To connect the host device 202 to the network controller, any appropriate type of the network interface 210 may be may be used, such as Peripheral Component Interconnect Express (PCIe) interface, a Secure Digital Input Output (SDIO) interface, a Universal Serial Bus (USB) interface, or any other similar type of a parallel or a serial connection. The network interface 210 may include an OSI network layer (not shown explicitly).

ULOME 220 may include multiple blocks such as an upper MAC layer (UMAC) 230, lower MAC layer (LMAC) 250, and physical layer (PHY) 270. The UMAC 230 and the LMAC 250 may constitute an OSI data link layer. In some implementations, different layers of ULOME 220 are implemented on a single-die chip. In other implementations, one or more chips may be used to host various layers of ULOME 220. For example, UMAC 230 and LMAC 250 may be implemented on a single chip and PHY 270 may be implemented on a separate die. In another example, all three layers may be implemented as separate devices. In those implementations where UMAC 230 and LMAC 250 are implemented on a single chip, the references to UMAC 230 and LMAC 250 should be understood as references to the respective functions provided by UMAC 230 and LMAC 250 rather than the actual physical locations where the referenced functionality is located.

The UMAC 230 may include internal monitoring 232 and external monitoring 234 modules. The internal monitoring 232 may monitor internal state of ULOME 220, including such parameters as temperature of ULOME 220 or any of its components (if implemented separately), voltages applied to various modules and parts of ULOME 220, and other physical parameters that may be relevant to the choice of an OM of the network connection. The external monitoring 234 may monitor conditions that are extraneous to ULOME 220, such as the amount of interference that various SS and/or antennas are experiencing. The information collected by internal monitoring 232 and external monitoring 234 may be provided to a transmission governor function (T-GOV) 240 where decision-making regarding an OM may be made. Other tasks that may be performed by T-GOV 240 include: notifying LMAC 250 about decisions to change the OM of the device 200 as well as detecting a change in the OM of another (initiating) device and notifying LMAC 250 about the changes in the OM initiated by another device, as described in more detail below in relation to FIGS. 3 and 4. UMAC 230 may further include a TXD module 236, which may generate, based on the metadata 205 of the data packets 207, transmission descriptors for the data packets. The transmission descriptors are depicted schematically as black rectangles included in frames 253. The term "frame" should be understood as any chunk of data prepared by the MAC layers for further processing by a physical layer (e.g., PHY 270) and transmission, via a radio, over a wireless network. A data frame (e.g., one of data frames 253) may include a data packet (e.g., one of data packets 207), IP addresses and MAC addresses of the host device 202 and/or ULOME 220, various headers, transmission descriptors and any other information (e.g., metadata) that may be used in processing, transmission, reception of the data packets. In some implementations, frames may be data frames, action frames, management frames, and so on.

The transmission descriptors may be used to communicate to PHY 270 how the respective frames 253 are to be transmitted. For example, the transmission descriptors may indicate a particular SS to be used (or multiple SS to be used) in transmission of the respective frame (e.g., data frame), the bandwidth of the transmission, the priority level, the rate of transmission, the power of the amplifier to be used in transmission, and other parameters of transmission as may be needed. Because the transmission descriptors depend on the specific OM used by ULOME 220, the TXD module 236 may be updated (by T-GOV 240) about changes in the OM, to change transmission descriptors of subsequent frames 253. UMAC 230 may also include a frame parser module 242 to detect the change in the OM used by the other devices by analyzing (parsing) RX frames 263 received from such device.

LMAC 250 may include transmission/reflection (TX/RX) actuator (TRACT) 255 and a reception governor function (R-GOV) 260. Operations performed by TRACT 255 may include: inserting OM change indicators into TX frames 253 to communicate to the other devices the change in the OM of ULOME 220, and modifying transmission descriptors of the TX (outgoing) frames 253 for the duration of time between detecting that the other device has implemented (e.g., initiated or agreed to) an OM change and a time when T-GOV 240 begins to generate transmission descriptor for subsequent TX frames using the new OM format. Detection that that the other device has implemented the OM change may be performed by R-GOV 260 based on the analysis of the RX (incoming) frames 263 received from the other device. The TX frames 253 and RX frames 263 may be held (prior to transmission and after reception) in TX registers 252 and reception registers 262, respectively, or in some other memory device. The TX registers 252 and RX registers 262 which may be FIFO (first-in-first-out) memory devices. LMAC 250 may further include a PHY programming module 254 to program PHY 270 using the transmission descriptors of the TX frames 253. LMAC 250 may also include a bit substitution engine (BSE) 256 to implement, upon instructions from TRACT 255, insertion of the OM change indicators, which may include modifying an appropriate field in a header of the corresponding TX frame 253.

Various blocks of UMAC 230 and LMAC 250 may be implemented in software and/or hardware. In some implementations, UMAC 230 may be implemented on an embedded processor (e.g., ARM® Cortex®-R4 processor) with T-GOV 240 and other modules of UMAC 230 implemented in software or firmware executed by the embedded processor. LMAC 250 may be implemented in a precision microcontroller that controls timing of transmission and reception of MAC Protocol Data Units (which may include TX frames 253 and RX frames 263) to and from PHY 270. TRACT 255 and R-GOV 260 may be implemented in software or firmware executed by the precision microcontroller. At least in some implementations BSE 256 may be implemented in hardware. Likewise, some of the components of UMAC 230 and LMAC 250 (including T-GOV 240, R-GOV 260, TRACT 255) may be implemented in a dedicated hardware.

PHY 270 may be 802.11ax physical layer or a physical layer that implements any other wireless standard enabling transmission of OM change indications within data frames. PHY 270 may be capable of receiving radio signals and transforming received signals into frames that may then be processed by the MAC layers. PHY 270 may also be capable of transforming frames received from MAC layers into radio signals and transmitting the radio signals using radio waves. PHY 270 may include (not shown explicitly) intermediate-frequency amplifiers, analog-to-digital converters, inverse Fourier transform modules, de-parsing modules, interleavers, error correction modules, scramblers, PHY-MAC padding layers, and other components. In some implementations, all PHY 270 components may be integrated into the same chip. In some implementations, the PHY 270 may be integrated with UMAC 230 and LMAC 250 on the same chip. In other implementation, some components, e.g. the analog-to-digital converters and/or intermediate-frequency amplifiers, may be executed by separate circuitry outside PHY 270. PHY 270 may have transmission processing components (TX processing) 272 and reception processing components (RX processing) 276. In some implementations, some of the TX processing 272 and RX processing 276 components may be shared. TX processing 272 and RX processing 276 may include various front end modules that interface PHY 270 with various antennas, such as one or more TX antenna(s) 274 and one or more RX antenna(s) 278. In some implementations, some of the antennas may operate as both TX antennas and RX antennas.

In some implementations, ULOME 220 may also include (not shown) one or more central processing units (CPU) and memory devices. ULOME 220 may also include input-output controllers to enable communications with external devices and structures, power management units, and other components. In one implementation, the interaction of the ULOME 220 components may happen as follows. The CPU may execute a logical link control (LLC) in communication with the memory device, receive data from the host device 202, prepare a data unit, e.g., a MAC service data unit (MSDU), and provide it to the MAC layers. The MAC layers may add additional bytes (e.g., header bytes and/or tail bytes) to form an appropriate MAC protocol data unit (MPDU). e.g., frame, before sending the protocol data unit to PHY 270 for digital-to-analog processing, intermediate-frequency amplification, and filtering. The analog signal output by PHY 270 may then be provided to the radio front end circuitry for radio-frequency processing and transmission through one or more of the antenna(s) 274. The reverse process may occur when an incoming radio-frequency signal is received through the antenna(s) 278.

UL may support various types of wireless networks, such as a WLAN or WWAN (e.g. a Wi-Fi® network), PAN (e.g. a Bluetooth® personal area network), and so on. In some implementations, a single ULOME 220 may supports two or more APs, e.g., APs operating at different bands (such as 2.4 GHz band and 5 GHz band) and having dedicated UMAC 230, LMAC 250, and PHY 270 for each band. In some implementations, some of UMAC 230, LMAC 250, and PHY 270 modules and components may be shared between different APs.

Figure 3:
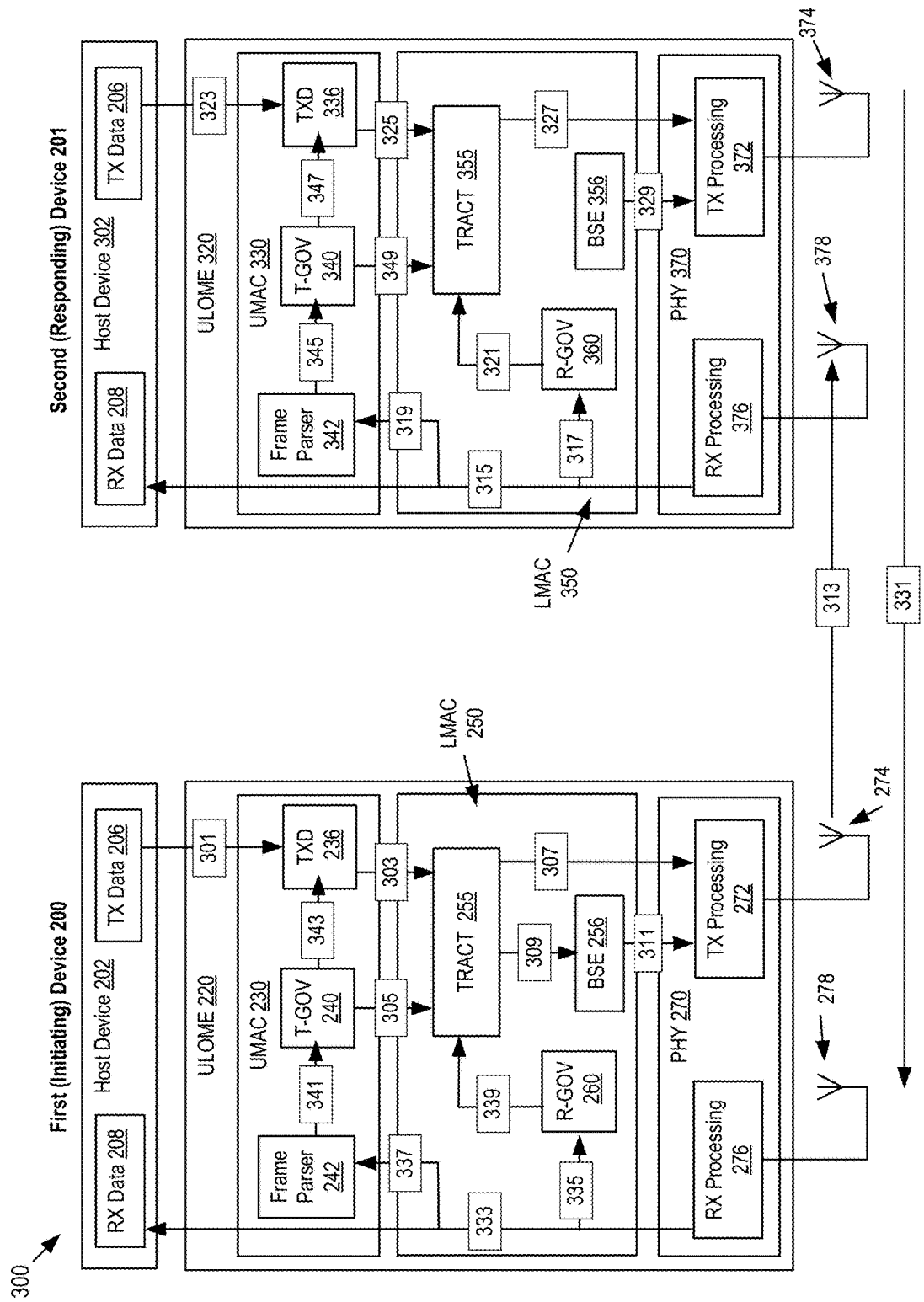
FIG. 3 is a block diagram illustrating example operations for fast and efficient operating mode changes in wireless networks that use ultra-low latency network controllers, in accordance with some implementations of the present disclosure.

FIG. 3 is a block diagram illustrating example operations 300 for fast and efficient operating mode changes in wireless networks that use ultra-low latency network controllers, in accordance with some implementations of the present disclosure. Shown in FIG. 3 are operations performed by a first (initiating) device, which may be device 200, and by a second (responding) device 201, which may have a similar architecture to device 200. Both devices may include ULOME controllers, e.g., ULOME 220 of the first device 200 and ULOME 320 of the second device 201. Components and modules of the two devices that have the same (or similar) functionality may be enumerated using numbers that differ by the first digit. For example, a component 2XY of the first device (e.g., TRACT 255) may have the same (or similar) functionality as a component 3XY of the second device (e.g., TRACT 355). Various operations of the OM changing process are indicated with odd-numbered blocks (boxes 301-349) with arrows indicating the directions of the flow of instructions and/or data associated with the respective operations. The numbers in the boxes are for identification purposes only and should not be understood as indicating a particular order of operations. For example, operations identified by different numbers may be performed concurrently. Operations identified by larger numbers may be performed earlier than operations identified by smaller numbers, and vice versa. For brevity and conciseness, and reader's convenience, components shown and described above with reference to FIG. 2 should be understood as still present in the first device 200 and the second device 201 even if not explicitly depicted.

An application executed by the host device 202 of the first device 200 may generate (block 301) a stream of MSDUs that include data packets 207 from TX data 206. Each data packet may include metadata describing the type and priority of the data packets 207. The metadata may be generated by the host device 202 or by the OSI network layer (not shown) of the first device 200. The MSDUs containing data packets 207 may be received by the TXD module 236 to generate, based on the metadata, transmission descriptors (TXD) for the data packets. The TXD may be prepended into each respective MSDU by the TXD module 236. Various other information may be added to form TX frames (or other MPDUs), e.g., TX frames 253. The TX frames 253 with the transmission descriptors added may be placed into a transmission queue maintained by TX FIFO registers 252 to await processing by PHY programming 254 and transfer to PHY 270. In the meantime, TRACT 255 may gain access to the TX frames (block 303). If ULOME 220 initiates no changes to the current OM, T-GOV 240 may take no action with regards to the TX frames in the queue. If, however, T-GOV 240, which is monitoring the intrinsic and extrinsic conditions of ULOME 220, determines that the OM is to be changed, T-GOV 240 may communicate the start of the OM change process to TRACT 255 (block 305). Unlike the normal operations, where TRACT 255 passes the TX frames to TX processing 272 unchanged (block 307), after the OM change process is started, TRACT 255 may begin inserting OM indicator change into headers of the TX frames waiting in the transmission queue, e.g., starting with the first TX frame not yet relayed to PHY 270. For example, the OM change indicator may be inserted into an HTC field (or some other pre-determined field) of the MAC header of the HEW TX data frame (or management, action, or any other TX frame) in the transmission queue. TRACT 255 may output instructions (block 309) to the bit substitution engine 256 to insert the OM change indicator to the respective field of the MAC header (as depicted schematically by outfitting the frame in box 256 with a checkered header). The BSE 256 may provide the data packet(s) with the OM change indicator inserted to TX processing 272 (block 311) for transmission to the second device. The OM change indicator may include description of the new OM (e.g. number of SS, bandwidth, etc.) to provide to ULOME 320 of the second device 201 the information necessary to implement the OM change.

In those instances where no TX frames 253 are presently contained in the transmission queue in TX FIFO 252, TRACT 255 may generate a null data frame (having no actual data payload), e.g., Quality of Service (QoS) data frame (or any other appropriate frame) with the OM change indicator inserted into the MAC header (e.g., into the HTC field of the MAC header).

The radio signals carrying the TX frames with the OM change indicator may be output by the TX antenna 274 of the first device 200 and received by the RX antenna 378 of the second device 201 (block 313). The RX processing 376 of the second device 201 may provide the received data packets to the host device 302 as part of RX data 208 (block 315). As part of block 315, PHY 370 may transform the received (RX) signals into RX frames 263 (as shown in FIG. 2) that may then be processed by MAC layers of ULOME 320. Concurrently with (or prior to) PHY 370 providing the data packets to the host device 302, R-GOV 360 may examine headers of the RX frames packets (block 317). Once R-GOV 360 detects OM change indicators in the MAC headers of the RX frames, R-GOV 360 may inform TRACT 355 (block 321) that the first device 200 has initiated the OM change.

Responsive to receiving the indication of the OM change, TRACT 355 may begin intercepting TX frames output by TXD 336. The TX frames may be built from MSDUs that contain TX data packets (block 323) prepared by the host device 302 and having transmission descriptors provided by the TXD 336 (block 325). More specifically, TRACT 355 may begin reprogramming transmission descriptors of the TX frames and providing TX frames with reprogrammed transmission descriptors for PHY programming (block 327). In particular, TRACT 355 may begin overriding bandwidth and/or number of SS information in the transmission descriptors with information received from the first device 200, e.g., new OM information obtained from the HTC filed of the MAC header of the RX frame(s) or from the OM notification elements of the (legacy) action frame. Reprogramming may be performed by PHY programming 254 (not shown) of LMAC 350. Optionally, OM indicator change may be inserted (block 329) by a BSE 356 of LMAC 350 into headers of the TX frames. As a result, based on the reprogrammed transmission descriptors, the TX frames output by TX processing 372 via TX antenna 374 of the second device 201 are transmitted using the new OM mode. The transmitted packets may be received (block 331) by the RX antenna 278 of the first device 200.

The RX processing 276 of the first device 200 may provide the received, from the second device 201, data packets (encoded in the received signals) to the host device 202 as part of RX data 208 (block 333). As part of block 333, PHY 270 may transform the received signals into RX frames that may then be processed by the MAC layers of ULOME 220. Concurrently with (or prior to) PHY 270 providing the RX data packets to the host device 202, R-GOV 260 may examine RX frames (e.g., the HTC fields of the headers of the RX frames) (block 335). Once R-GOV 260 detects that RX frames received by first device 200 from the second device 201 that include an acknowledgment (ACK) frame, R-GOV 260 begins to reciprocate by initiating transmission of data from the first device 200 to the second device 201 in the new OM. Specifically, R-GOV 260 may inform TRACT 255 (bock 339) that the second device 201 has accepted the OM change.

Responsive to receiving the acceptance of the OM change, TRACT 255 may begin intercepting output TX data frames awaiting transmission in the TX FIFO 252 and reprogramming transmission descriptors of the TX frames. Reprogramming may be performed by PHY programming module 254 of LMAC 250. Data packets with reprogrammed transmission descriptors may be provided to TX processing 272 for transmitting via TX antenna 274 to the second device 201. As a result, the first device 200 responds extremely quickly to the accepted (by the second device 201) OM change, as already the first frame currently in the TX FIFO 252 may be transmitted to the second device 201 using the new OM.

In addition to examination (block 335) of the RX data frames by R-GOV 260 performed within LMAC 250, the RX data frames may be sent to UMAC 230 for further processing. For example, the frame parser 242 of UMAC 230 may also examine RX frames (block 337). The RX frames may include the ACK frame transmitted by the second device 201 to confirm that the second device 201 has transitioned to the new OM. Having detected the presence of the ACK frame with the OM change acknowledgement using the frame parser 242 (block 341), T-GOV 240 may start providing, to the new frames added at the back of the transmission queue, transmission descriptors in the new OM (block 343). T-GOV 240 may also inform TRACT 255 when to stop reprogramming the descriptors from the old OM to the new OM, e.g., based on the identifier of the first TX data packet provided with the new OM transmission descriptor. Alternatively, to determine when to stop reprogramming, TRACT 255 may continue examining transmission descriptors of the frames in the queue until detecting a first frame with the transmission descriptor programmed in the new OM.

In parallel, similar operations may be performed by UMAC 330 of the second device 201. Specifically, in addition to examination (block 317) of the RX data frames received from the first device 200 by R-GOV 360 performed within LMAC 350, the frame parser 342 of UMAC 330 may also examine RX data frames received from the first device 200 (block 319). Having detected the presence of an ACK frame with the OM acknowledgement using the frame parser 342 (block 345), T-GOV 240 may start providing, to the new packets added at the back of the transmission queue of the TX frames, transmission descriptors in the new OM (block 347). T-GOV 340 may also inform TRACT 355 (block 349) when to stop reprogramming the descriptors from the old OM to the new OM, e.g., based on the identifier of the first TX data packet provided with the new OM transmission descriptor. Alternatively, to determine when to stop reprogramming, TRACT 355 may continue examining transmission descriptors of the frames in the queue until detecting a first frame with the transmission descriptor programmed in the new OM. In some implementations, functionality of the frame parser 342 may be combined with the functionality of R-GOV 360, with the combined R-GOV 360 informing both the T-GOV 340 (block 345) and TRACT 355 (block 321) that the first device 200 has initiated the OM change.

Figure 4:
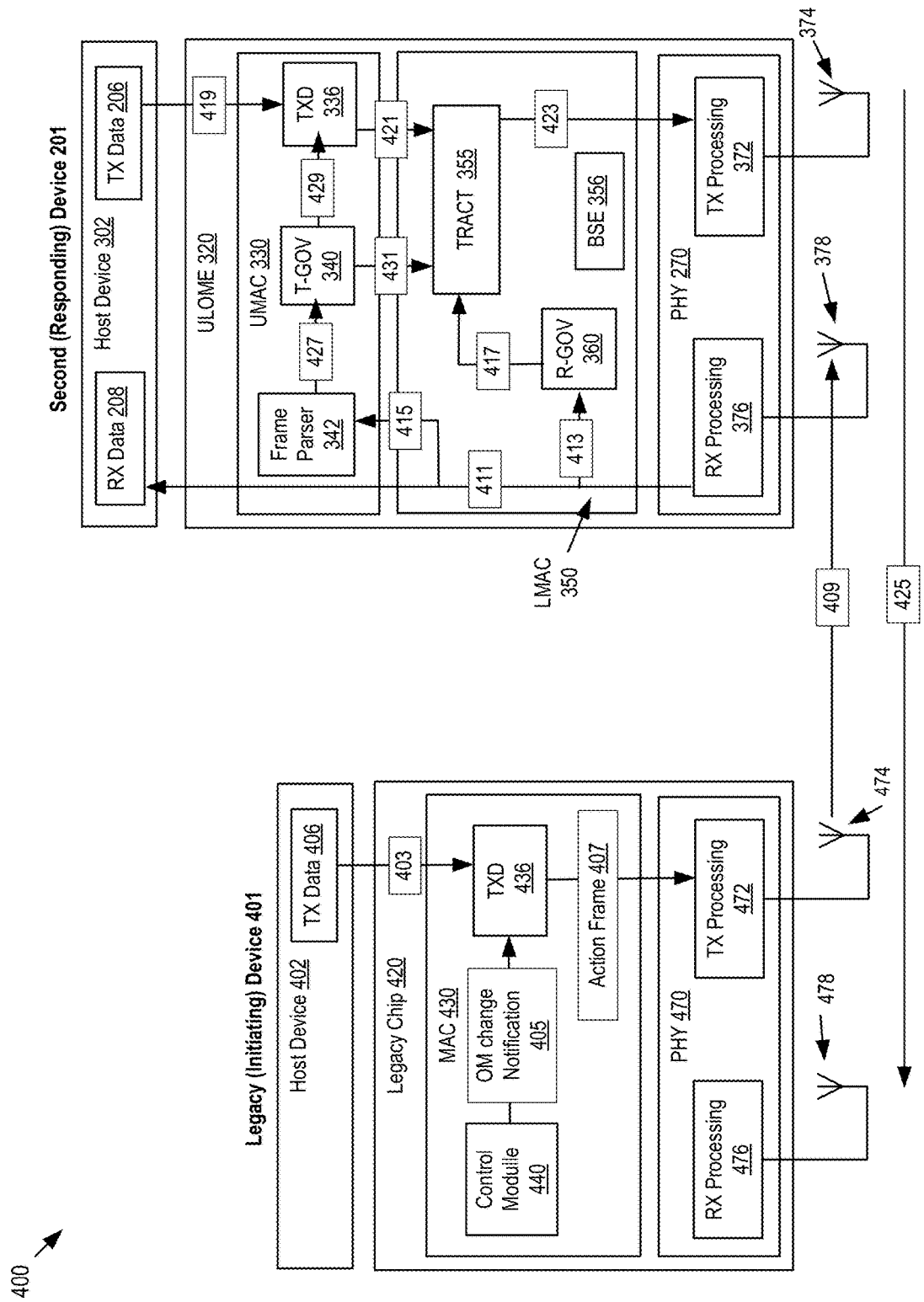
FIG. 4 is a block diagram illustrating example operations for fast and efficient operating mode changes in wireless networks that involve legacy devices, in accordance with some implementations of the present disclosure.

FIG. 4 is a block diagram illustrating example operations 400 for fast and efficient operating mode changes in wireless networks that involve legacy devices, in accordance with some implementations of the present disclosure. Shown in FIG. 4 are operations performed by a legacy (initiating) device 401 and by a second (responding) device 201. The legacy device 401 may not have a ULOME controller whereas the second device similar to the second device 201 in FIG. 3 and may include ULOME 320. Various operations of the OM changing process are indicated with small odd-numbered blocks (boxes 403-431) with arrows indicating the directions of the flow of instructions and/or data associated with the respective operations. The numbers in the boxes are for identification purposes only and should not be understood as indicating a particular order of operations. For example, operations identified by different numbers may be performed concurrently. Operations identified by larger numbers may be performed earlier than operations identified by smaller numbers, and vice versa. For brevity and conciseness, and reader's convenience, components shown and/ or described above with reference to FIG. 2 should be understood as still present in the second device 201 even if not explicitly depicted. Similarly, the legacy device 401 may include additional components not shown explicitly in FIG. 4, such as CPUs, memory devices, power management units, input-output controllers, and so on.

An application executed by a host device 402 of the legacy device 401 may generate (block 403) a stream of TX data packets from TX data 406. Each data packet may include metadata describing the type and priority of the data packets. The metadata may be generated by the host device 402, by the OSI network layer (not shown), by a CPU of a legacy chip 420 (not shown). The MSDUs containing packets may be received by the TXD module 436 to generate, based on the metadata, transmission descriptors for the TX data packets. The TXD may be prepended into each respective MSDU by the TXD module 436. Various other information may be added to form TX frames (or other MPDUs). The TX frames with the transmission descriptors added may be placed into a transmission queue maintained by TX FIFO registers to await processing by PHY programming and transfer to PHY 470. A legacy control module 440 may be monitoring the intrinsic and extrinsic conditions of the legacy chip 420. The control module 440 may determine that the OM of the legacy chip 420 is to be changed. The control module 440 may start of the OM change process by providing an OM change notification to the TXD module 436 or, alternatively, to some other software executed by the CPU of the legacy chip 420 (block 405). The MAC 430 may generate an action frame (block 407) to communicate a request for an OM change to the second device 201. The action frame may be placed at the back of the current queue of TX frames and may include a description of the new OM (e.g. number of SS, bandwidth, etc.) to provide to the second device 201 the information necessary to implement the OM change.

The action frame may be processed by TX processing 472 of the legacy device 401 and transmitted via TX antenna 474 to the second device 201 (block 409). The action frame may be received by the RX antenna 378 of the second device 201 (block 409). The RX processing 376 of the second device 201 may provide the received data packets to the host device 302 as part of RX data 208 (block 411). As part of block 411, PHY 270 may transform the received signals into frames that may then be processed by MAC layers of ULOME 320. Concurrently with (or prior to) PHY 370 providing the received data packets to the host device 302, R-GOV 360 may examine headers of the RX frames (block 413). Once R-GOV 360 detects the presence of the action frame among the RX frames, R-GOV 360 may inform TRACT 355 (block 417) that the legacy device 401 has initiated the OM change.

Responsive to being informed of the OM change, TRACT 355 may begin intercepting TX data frames with the transmission descriptors output by the TXD 336 (block 421). The TX frames may be built from MSDUs that contain TX data packets (block 419) prepared by the host device 302 and having transmission descriptors provided by the TXD 336 (block 421). More specifically, TRACT 355 may begin reprogramming transmission descriptors of the TX frames and providing TX frames with reprogrammed transmission descriptors for PHY programming (block 423). In particular, TRACT 355 may begin overriding bandwidth and/or number of SS information in the transmission descriptors with information received from the first device 401, e.g., new OM information obtained from the HTC filed of the MAC header of the RX frame(s) or from the OM notification elements of the (legacy) action frame. Reprogramming may be performed by PHY programming module 254 (not shown) of LMAC 350. As a result, based on the reprogrammed transmission descriptors, the TX data frames processed and output by TX processing 372 via TX antenna 374 of the second device 201 may be transmitted using the new OM mode and received (block 425) by the RX antenna 478 and processed by RX processing 476 of the legacy device 401.

In addition to examination (block 413) of the RX data frames received from the legacy device 401 by R-GOV 360 performed within LMAC 350, the RX data frames may be sent to UMAC 230 for further processing. For example, the frame parser 342 of UMAC 330 may also examine RX frames received from the legacy device 401 (block 415). Having detected the presence of an ACK frame with the OM change acknowledgement using the frame parser 342 (block 427), T-GOV 340 may instruct TXD 336 to start providing, to the new frames added at the back of the queue of the transmission queue, transmission descriptors in the new OM (block 429). T-GOV 340 may further inform TRACT 355 (block 431) when to stop reprogramming the descriptors from the old OM to the new OM, e.g., based on the identifier of the first TX data frame equipped with the new OM transmission descriptor. Alternatively, to determine when to stop reprogramming, TRACT 355 may continue examining transmission descriptors of the frames in the queue until detecting a first frame with the transmission descriptor programmed in the new OM.

Figure 5:
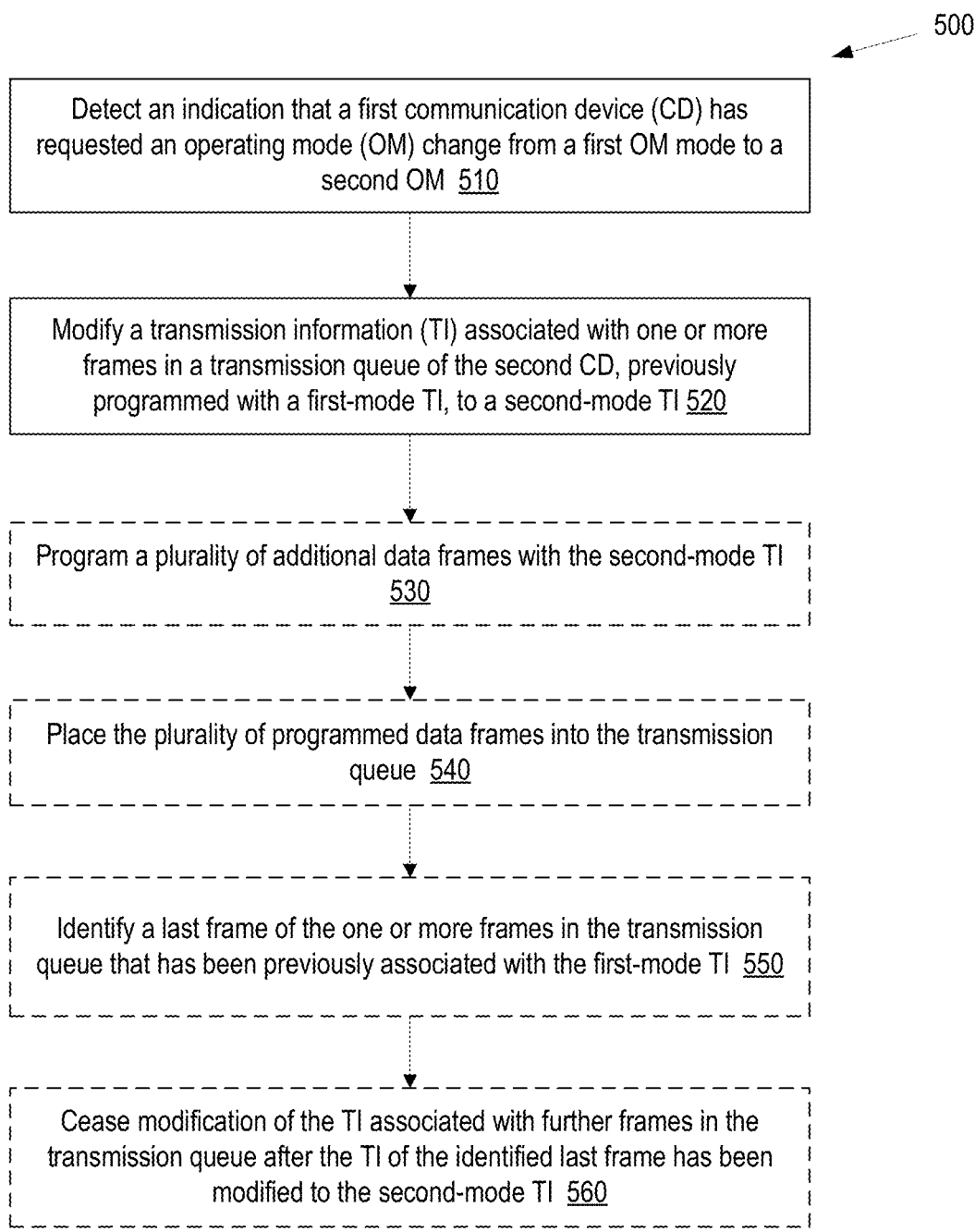
FIG. 5 is a flow diagram of an example method of fast and efficient operating mode changes in wireless networks performed by a responding device, in accordance with some implementations of the present disclosure.

FIG. 5 is a flow diagram of an example method 500 of fast and efficient operating mode changes in wireless networks performed by a responding device, in accordance with some implementations of the present disclosure. Method 500 may be performed by a processing logic of ULOME 220 of FIG. 2 or ULOME 320 of FIGS. 3 and 4. The processing logic performing method 500 may include hardware (e.g., circuitry, dedicated logic, programmable logic, microcode, etc.), software (which may perform operations of T-GOV 240 and 340, R-GOV 260 and 360, TRACT 255 and 355), firmware, or a combination thereof. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processing threads implementing method 500 may be executed asynchronously with respect to each other. Various operations of method 500 may be performed in a different order compared with the order shown in FIG. 5. Some operations of the methods may be performed concurrently with other operations. Some operations may be optional.

Method 500 may be performed to effectuate an operating mode change of a wireless connection between a first (initiating) communication device (CD) and a second (responding) CD. In one implementation, method 500 may be performed by the processing logic of the second CD. At operation 510, the processing logic performing method 500 may detect an indication that the first CD has requested the operating mode change from a first operating mode to a second operating mode. For example, R-GOV of the second CD may detect an operating mode indication in a MAC header of a frame received from the first CD. If the first CD is a IEEE 802.11ax device, the operating mode indication may be located in a High Throughput Control field of the MAC header of a frame, such as a QoS data frame received from the first CD. Alternatively, if the first CD is a IEEE 802.11ac device, the operating mode indication may be an operating mode notification (OMN) element in an action frame received from the first CD. The operating mode change communicated with the operating mode indication may include a change of a number of spatial streams of the wireless connection or a bandwidth of the wireless connection.

At operation 520, method 500 may continue with the processing logic modifying a transmission information (TI) associated with one or more frames in a transmission queue of the second CD. The one or more frames in the transmission queue may have been previously programmed with a first-mode transmission information. The TI may include a representation that may be used by a physical layer of the second CD to configure transmission of a respective frame to the first CD. In one implementation, TI may be a transmission descriptor (TXD) within the one or more frames. In another implementation, TI may be a separate resource, such as a cache (register, or any other memory device), a table (e.g., a mapping table, a look-up table, etc.) that maps the one or more frames to the representation used by the physical layer to configure transmission of the respective frames. The cache and/or a table may be periodically updated to identify which frames in the queue are to be transmitted using which specific operating modes. In some implementations, the transmission information may not be a code or direct instruction to the physical layer, but may be an intermediate representation that may be used by the LMAC 250 and/or PHY programming 254 to generate the code or instruction to the physical layer to configure transmission of the respective frame. The first-mode transmission information may include a representation used to program transmission in the first operating mode (e.g., having a first number of spatial streams and a first bandwidth). The modification of the transmission information may include changing or reprogramming the transmission information to a second-mode transmission information (e.g., having a second number of spatial streams and a second bandwidth).

Operations 530-560, as indicated with dashed boxes, may be optional. At operation 530, method 500 may continue with the processing logic, responsive to detecting the indication that the second CD has requested the operating mode change, programming an additional plurality of data frames with the second-mode transmission information. The additional data frames may include any data, action, managements, etc., frames prepared by the MAC layer after the request of the operating mode change has been detected. At operation 540, the plurality of programmed additional data frames may be placed into the transmission queue. As a result, the transmission queue may include frames associated with the first-mode transmission information (older frames) and the second-mode transmission information (more recent frames). Prior to being relayed to the PHY layer, the older frames associated with transmission information modified to the second operating mode, e.g., by TRACT 255.

At operation 550, the processing logic may identify the last frame in the transmission queue that has been previously programmed in association with the first-mode transmission information and, at operation 560, cease modifying transmission information of further (more recent) frames in the transmission queue, after the transmission information of the identified last frame has been modified to the second-mode transmission information.

Figure 6:
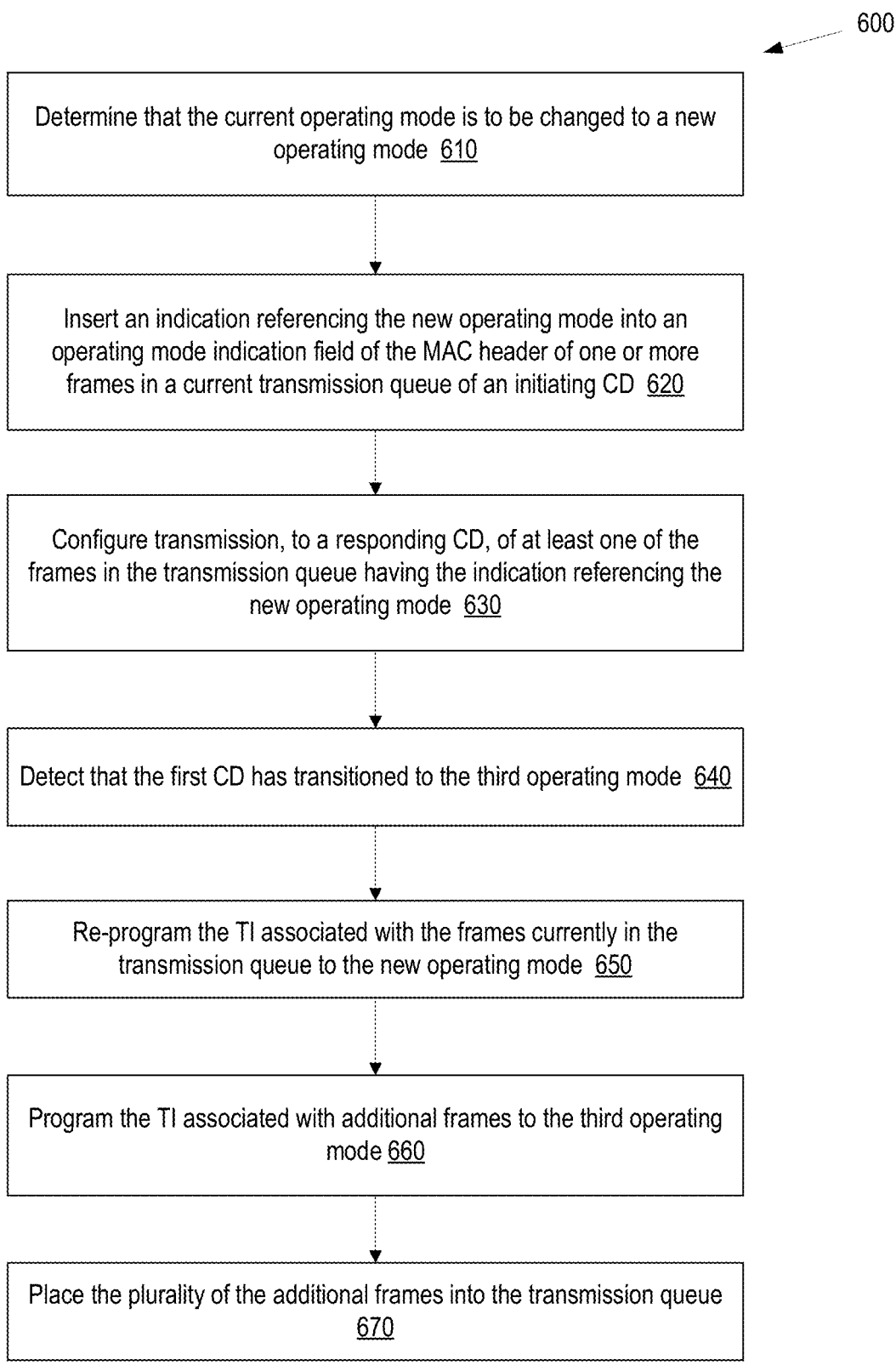
FIG. 6 is a flow diagram of an example method of fast and efficient operating mode changes in wireless networks performed by an initiating device, in accordance with some implementations of the present disclosure.

FIG. 6 is a flow diagram of an example method 600 of fast and efficient operating mode changes in wireless networks performed by an initiating device, in accordance with some implementations of the present disclosure. Method 600 may be performed by a processing logic of ULOME 220 of FIGS. 2 and 3. The processing logic performing method 600 may include hardware (e.g., circuitry, dedicated logic, programmable logic, microcode, etc.), software (which may perform operations of T-GOV 240, R-GOV 260, TRACT 255), firmware, or a combination thereof. In certain implementations, method 600 may be performed by a single processing thread. Alternatively, method 600 may be performed by two or more processing threads, each thread executing one or more individual functions, routines, subroutines, or operations of the method. In an illustrative example, the processing threads implementing method 600 may be synchronized (e.g., using semaphores, critical sections, and/or other thread synchronization mechanisms). Alternatively, the processing threads implementing method 600 may be executed asynchronously with respect to each other. Various operations of method 600 may be performed in a different order compared with the order shown in FIG. 6. Some operations of the methods may be performed concurrently with other operations. Some operations may be optional.

Method 600 may be performed to effectuate an operating mode change of a wireless connection between an initiating communication device (CD) and a responding CD. In one implementation, method 600 may be performed by the processing logic of the first CD. In some implementations, method 600 may be performed after method 500 with the second (responding) CD of method 500 being the initiating CD of method 600 and the first (initiation) CD of method 500 being the responding CD of method 600. For example, a first CD, e.g., AP 102 in communication with a second CD, e.g., STA 110, may initiate an OM upgrade from a first OM to a second OM. Subsequently, at a later time, having experienced detrimental interference, STA 110 may initiate an OM downgrade from the second OM to a third OM.

At operation 610, the processing device performing method 600 may determine that the current operating mode is to be changed to a new operating mode. For example, T-GOV 240 may determine that the temperature of the ULOME chip has increased (or decreased) or that the number of reliable spatial streams has changed due to decreased (or increased) interference from other streams or devices.

At operation 620, method 600 may continue with the TRACT 255 of LMAC 250 inserting an indication referencing the new operating mode into an operating mode indication field of the MAC header of one or more frames in a current transmission queue of the initiating CD. At operation 630, the physical layer (e.g., PHY 270) may configure transmission, to the responding CD, of at least one of the frames in the transmission queue having the indication referencing the new operating mode. At operation 640, the processing device performing method 600 may detect that the responding CD has transitioned to the new operating mode. For example, R-GOV 260 of LMAC 250 may determine that the responding CD has begun sending frames using the new operating mode.

At operation 650, method 600 may continue with re-programming the transmission information of the frames currently in the transmission queue of the initiating device to the new operating mode (e.g., frames previously programmed with the old operation mode transmission information). At operation 660, the processing device may further program the transmission information of a plurality of additional frames to the new operating mode, and at operation 670 may place the plurality of additional frames into the transmission queue of the initiating CD.

Figure 7:
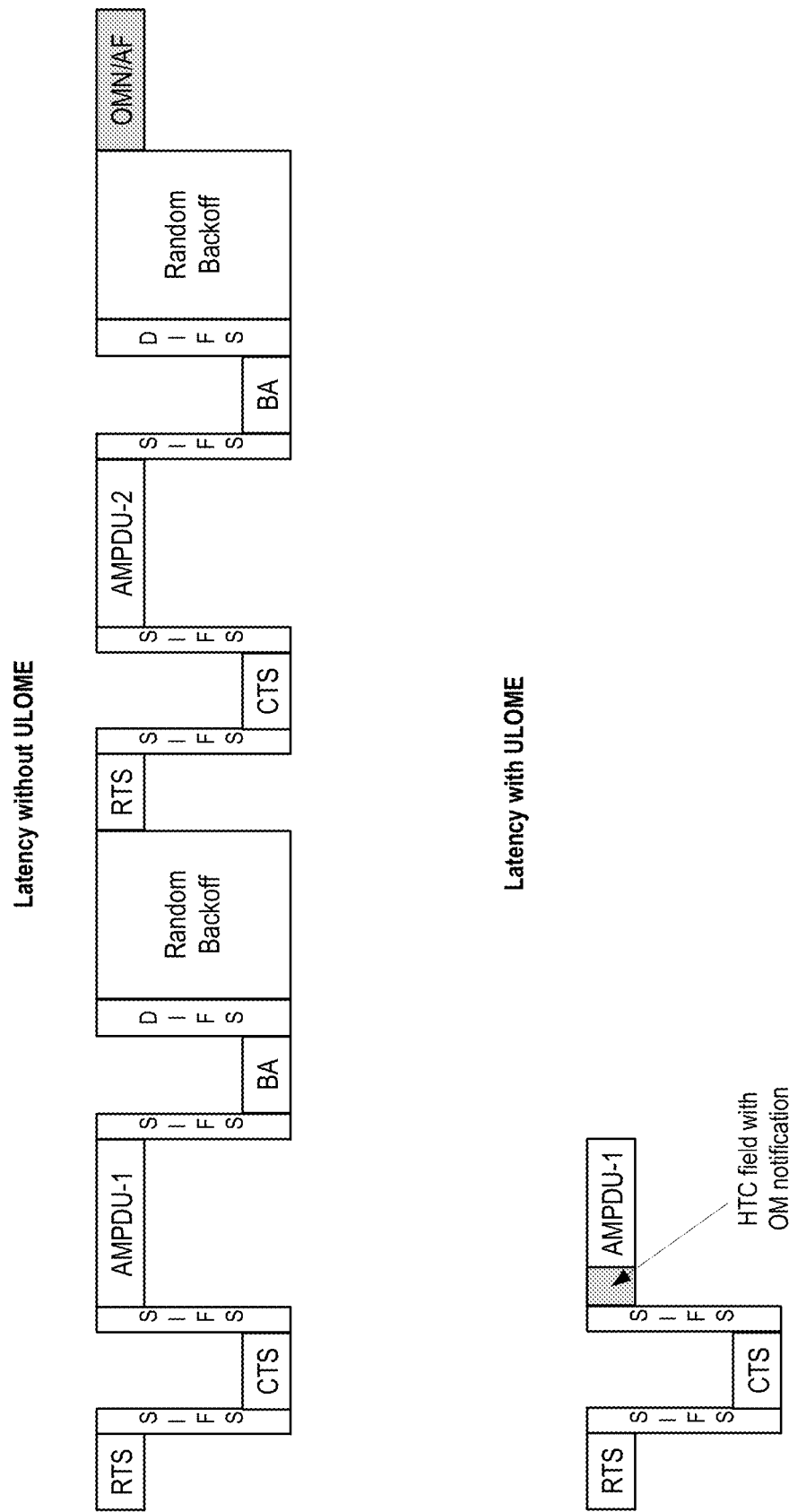
FIG. 7 illustrates the advantages of the implementations disclosed by comparing latency in legacy wireless devices (the upper diagram) with latency in wireless devices having ULOME functionality (the lower diagram).

FIG. 7 illustrates the advantages of the implementations disclosed by comparing latency in legacy wireless devices (the upper diagram) with latency in wireless devices having ULOME functionality (the lower diagram). With reference to the upper diagram, the initiating legacy device may have to transmit the entire current content of TX FIFO registers before an action frame (AF) with an OM notification element (OMN) may be transmitted to the responding device. The TX FIFO content may include two (in one illustrative example) aggregated MPDU (AMPDU), each having 64 MPDU. Shown is the timing of the process with the upper row indicating data sent by the initiating device and the lower row indicating data sent by the responding device. For example, the initiating device may transmit, for each AMPDU (e.g., AMPDU-1 and AMPDU-2), a request to send (RTS) signal and receive from the responding device a clear to send (CTS) signal and a block acknowledgement (BA) signal, in addition to a number of Shortest Interframe Spacings (SIFS), Distributed coordination function Inter-Frame Spacings (DIFS), and random backoffs, before the action frame with the OMN (gray block) is transmitted. In one example, with 2 spatial streams, 80 MHz bandwidth, and VHT Modulation and Coding Index 7, the time before OMN/AF is transmitted may exceed 3,500 us (plus the duration of the two backoff intervals). In contrast, the lower row, which illustrates provisioning of an OM notification in wireless devices with the ULOME controllers, includes a single set of RTS and CTS (with intervening SIFS) before a field (e.g., an HTC field) may be transmitted with the first frame (which may be a data frame or any other frame) of the first AMPDU. As a result, the latency may be less than 80 us.

It should be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The implementations of methods, hardware, software, firmware or code set forth above may be implemented via instructions or code stored on a machine-accessible, machine readable, computer accessible, or computer readable medium which are executable by a processing element. "Memory" includes any mechanism that provides (i.e., stores and/or transmits) information in a form readable by a machine, such as a computer or electronic system. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation, implementation, and/or other exemplarily language does not necessarily refer to the same implementation or the same example, but may refer to different and distinct implementations, as well as potentially the same implementation.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. A method of effectuating an operating mode change of a wireless connection between a first communication device (CD) and a second CD, the method comprising:
    detecting, by a wireless network controller of the second CD, an indication that the first CD has requested the operating mode change from a first operating mode to a second operating mode;
    responsive to the detected indication, identifying, by the wireless network controller, one or more frames in a transmission queue of the second CD, wherein the one or more frames were associated, prior to the detected indication, with a first-mode transmission information (TI), and wherein the first-mode TI is configured to cause a physical layer of the second CD to effectuate transmission of the one or more frames in the transmission queue using the first operating mode;
    modifying, by the wireless network controller, the first-mode TI to a second-mode TI, wherein the second-mode TI is configured to cause the physical layer of the second CD to effectuate transmission of the one or more frames in the transmission queue using the second operating mode;
    associating a plurality of additional frames with the second-mode TI; and
    placing the plurality of additional frames into the transmission queue.

2. The method of claim 1, wherein detecting the indication that the first CD has requested the operating mode change comprises detecting an operating mode indication in a MAC header of a frame received from the first CD.

3. The method of claim 2, wherein the frame received from the first CD is a Quality of Service data frame.

4. The method of claim 1, wherein detecting the indication that the first CD has requested the operating mode change comprises detecting an operating mode notification element in an action frame received from the first CD.

5. The method of claim 1, further comprising:
    identifying a last frame of the one or more frames in the transmission queue associated with the first-mode TI; and
    ceasing modification of the TI associated with further frames in the transmission queue after the TI associated with the identified last frame has been modified to the second-mode TI.

6. The method of claim 1, wherein the operating mode change of the wireless connection comprises at least one of a change of a number of spatial streams of the wireless connection or a bandwidth of the wireless connection.

7. The method of claim 1, wherein the second-mode TI associated with the one or more frames comprises a transmission descriptor within the one or more frames.

8. An apparatus comprising:
a memory; and
a processing device coupled to the memory, the processing device configured to:
    detect an indication that a communication device (CD) has requested an operating mode change of a wireless connection from a first operating mode to a second operating mode;
    responsive to the detected indication, identify one or more frames in a transmission queue, wherein the one or more frames were associated, prior to the detected indication, with a first-mode transmission information (TI), and wherein the first-mode TI is configured to cause a physical layer communicatively coupled to the processing device to effectuate transmission of the one or more frames in the transmission queue using the first operation mode;
    modify the first-mode TI to a second-mode TI, wherein the second-mode TI is configured to cause the physical layer to effectuate transmission of the one or more frames in the transmission queue using the second operating mode;
    associate a plurality of additional frames with the second-mode TI; and
    place the plurality of additional frames into the transmission queue.

9. The apparatus of claim 8, wherein to detect the indication that the CD has requested the operating mode change the processing device is to:
    detect an operating mode indication in a MAC header of a frame received from the CD; or
    detect an operating mode notification element in an action frame received from the CD.

10. The apparatus of claim 8, wherein the processing device is further to:
    identify a last frame of the one or more frames in the transmission queue associated with the first-mode TI; and
    cease modification of the TI associated with further frames in the transmission queue after the TI associated with the identified last frame has been modified to the second-mode TI.

11. A system comprising:
one or more antennas;
a physical layer of a second communication device (CD), the physical layer to configure transmission to a first CD, via the one or more antennas, of one or more frames in a transmission queue of the second CD based on a transmission information (TI) associated with a respective frame of the one or more frames; and
a media access control (MAC) layer of the second CD, the MAC layer communicatively coupled to the physical layer, the MAC layer to:
    program the TI associated with the one or more frames in the transmission queue to a first operating mode of the first CD;
    detect an indication that the first CD has requested an operating mode change, from the first operating mode to a second operating mode, of a wireless connection of the first CD and the second CD;
    re-program the TI associated with the one or more frames in the transmission queue to the second operating mode, wherein the TI was programmed prior to the indication being detected by the second CD;

associate a plurality of additional frames with the second operating mode; and place the plurality of additional frames into the transmission queue.

12. The system of claim 11, wherein to detect the indication that the first CD has requested the operating mode change, the MAC layer is to detect an operating mode indication in a MAC header of a frame received from the first CD.

13. The system of claim 12, wherein the frame received from the first CD is a Quality of Service data frame.

14. The system of claim 11, wherein to detect the indication that the first CD has requested the operating mode change the MAC layer is to detect an operating mode notification element in an action frame received from the first CD.

15. The system of claim 11, wherein the MAC layer is further to:

identify a last frame of the one or more frames in the transmission queue that have the TI associated with a first operating mode; and cease to re-program the TI of the frames in the transmission queue after the TI of the identified last frame has been re-programmed to the second operating mode.

16. The system of claim 11, wherein the operating mode change of the wireless connection comprises at least one of a change of a number of spatial streams of the wireless connection or a bandwidth of the wireless connection.

17. The system of claim 11, wherein the MAC layer is further to:

determine that the second operating mode is to be changed to a third operating mode;

insert an indication referencing the third operating mode into an operating mode indication field of a MAC header of one or more frames in a current transmission queue of the second CD; and wherein the PHY layer is further to:

configure transmission, to the first CD, of at least one of the frames in the transmission queue having the indication referencing the third operating mode.

18. The system of claim 17, wherein the MAC layer is further to:

responsive to detecting that the first CD has transitioned to the third operating mode, re-program the TI associated with a plurality of frames currently in the transmission queue to the third operating mode;

associate the TI of a plurality of additional frames to the third operating mode; and place the plurality of additional frames into the transmission queue.

19. The system of claim 11, wherein the TI associated with the one or more frames comprises a transmission descriptor within the one or more frames.

20. The system of claim 11, further comprising a host system communicatively coupled to the MAC layer, wherein the one or more frames comprise data packets obtained from the host system.

* * * * *